United States Patent [19]

Kerdiles et al.

[11] Patent Number: 4,685,626

[45] Date of Patent: Aug. 11, 1987

[54] CRUSHED CARCASE SEPARATION HEAD AND MACHINE

[75] Inventors: Jean P. Kerdiles, Plogastel Saint-Germain; Roger Marlot, Quimper, both of France

[73] Assignee: Les Innovations Mecaniques Alimentaires (S.A.R.L.), Bannalec, France

[21] Appl. No.: 743,943

[22] Filed: Jun. 12, 1985

[30] Foreign Application Priority Data

Jun. 14, 1984 [FR] France ............................ 84 09534

[51] Int. Cl.⁴ ...................... B02C 19/22; B02C 23/16; A22C 17/00
[52] U.S. Cl. ........................................ 241/74; 17/1 G
[58] Field of Search .............. 17/1 G, 46, 56; 241/74, 241/260.1, 82.1, 89.4, 247; 418/255

[56] References Cited

U.S. PATENT DOCUMENTS

| 39,540 | 8/1863 | Banks | 418/255 |
| 4,025,001 | 5/1977 | Yarem et al. | 17/1 G X |

FOREIGN PATENT DOCUMENTS

| 0132084 | 1/1985 | European Pat. Off. | 17/46 |
| 815600 | 10/1951 | Fed. Rep. of Germany | 241/82.1 |
| 2702653 | 7/1978 | Fed. Rep. of Germany | 241/260.1 |
| 3346063 | 9/1984 | Fed. Rep. of Germany | 17/46 |
| 798887 | 3/1936 | France | 241/82.1 |
| 0170868 | 10/1983 | Japan | 418/255 |
| 329 | of 1908 | United Kingdom | 241/82.1 |

Primary Examiner—Willie G. Abercrombie
Attorney, Agent, or Firm—Fiddler & Levine

[57] ABSTRACT

The invention concerns a mechanical separation head intended particularly for the treatment of crushed carcases and machine which is equipped with it. In such a separation head (100), and thus in the machine equipped with it, the drive under pressure against the grille (4) forming a sieve of the product to be treated is obtained by means of a vane (16) pump (P) serving at the connection of the crusher (18) and the head and which cooperates with a member (2) of which the double function is on the one hand to mash the product, and on the other hand to scrape the interior of the grille. Such a member (2) has a plurality of teeth (a,b,c ... n) having a scraping surface (101), these teeth being spaced so that the totality of the internal face of the grille (4) is scraped. The invention is applicable to the treatment of any type of product having recoverable residual flesh such as animal carcases, fishbones, and shellfishes' shells.

8 Claims, 8 Drawing Figures

FIG_1

FIG. 2

FIG_3

FIG_4

FIG_5

FIG.6

FIG_7

FIG_8

CRUSHED CARCASE SEPARATION HEAD AND MACHINE

The present invention relates to a mechanical separation head, particularly intended for the treatment of crushed carcases. It also relates to machines which are equipped with it.

It is known to treat carcases, in the general sense, of animals coming for example from abattoirs for separating the meat from the bones, in order to dress the meat and distribute it for varying applications in the field of foodstuffs. It is the same for fish and shellfish; separation is wanted of the flesh from the bones and from the shells.

Machines intended for this application are known. They are essentially constituted by the combination of a helicoidal drive screw for the product to be treated which drives and presses the product against a grille assuring the extrusion of the flesh and other soft substances which are then recovered, while the animal bones or fishbones are emptied in the form of waste.

On the one hand, the drive via a helicoidal screw creates tight packing in the region of the grille because fragments of bone can be introduced into the mesh of the grille, obstructing it and blocking the system. On the other hand, risks of poor distribution of the materials to be treated along the length of their path are to be feared, as well as risks of heating which are harmful to conditions of hygiene required for material treating of food products.

The present invention has the object of alleviating these inconveniences and relates to a separation head in which the product to be treated is pressed against the grille with efficacity whilst all the time being constantly mashed by a mashing member, so that the risk of seeing a crust of bone form at the periphery and a concentration of soft parts at the centre is avoided.

The present invention also has the object of providing a separation head of which the meshing member ensures equally a scraping function over the entire internal surface of the grille. Thus any fragments of animal bone, fish bone, or the like, which tend to obstruct the mesh of the sieve, are automatically scraped up and taken into the mass of the product and then mashed with the rest.

Another object of the invention is to provide a machine equipped with such a separation head having the qualities of simplicity of operation (a sole drive means for all the rotating members) and of particularly easy upkeep, each element constituting the machine being easy to dismount and clean.

The present invention more precisely concerns a mechanical separation head intended particularly for treatment of crushed carcases; characterised in that it comprises on the one hand a means for driving the product against a grille fixed with respect to the head with a pressure sufficient for the flesh to be separated from the carcase and extruded across the meshes of the grille; on the other hand, a member for mashing and scraping capable of homogenising the product during its transit in the separation head from the entry to the exit and scraping the internal surface of the grille for eliminating the hard elements which tend to obstruct the meshes of it.

The invention will be better understood with the aid of the explanations which follow and the accompanying drawings in which.

For greater clarity, the same elements have the same references in all the Figures.

The described example more precisely concerns the extraction of meat remaining attached to animal bones, but it could equally act, as has been mentioned previously, on flesh of fish or shellfish.

Figure 1:
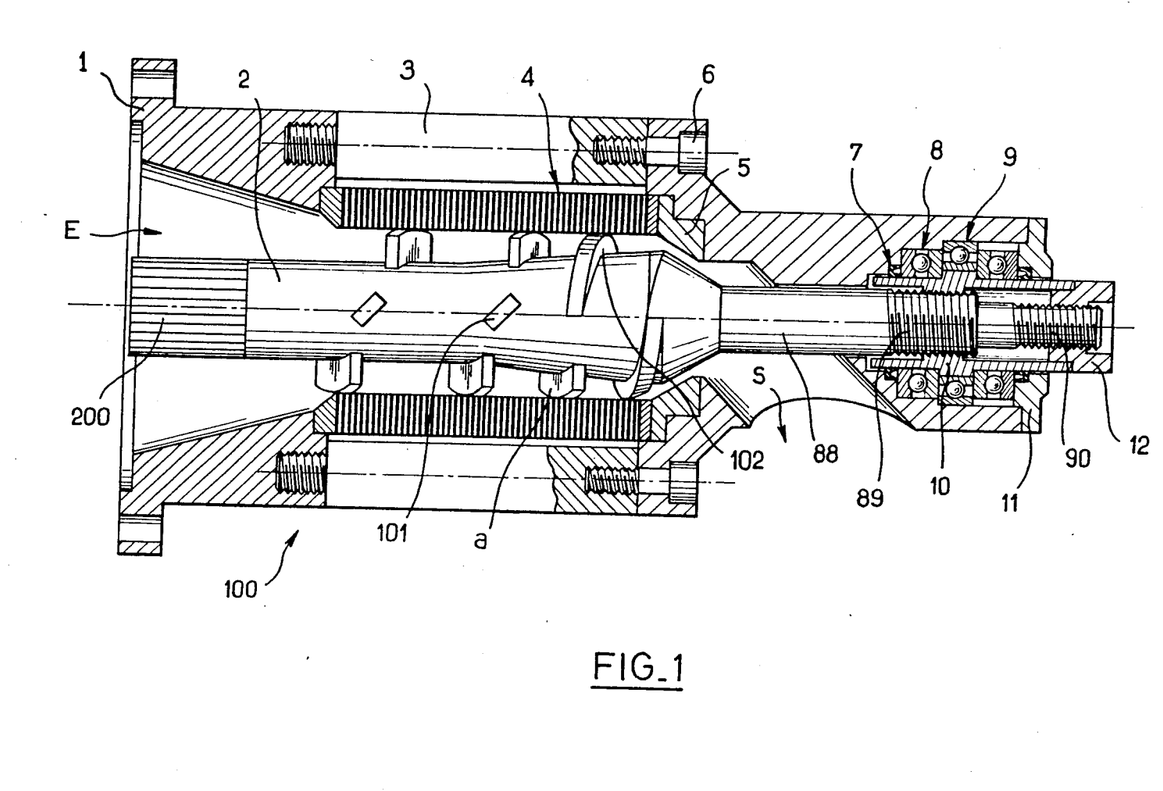
FIG. 1 illustrates schematically a separation head according to the invention.

FIG. 1 shows schematically a mechanical separation head 100. It is, in accordance with an important characteristic of the invention, constituted by the combination of a mashing and scraping member 2 of which the double function will be described below, and which cooperates with a grille 4 serving as a sieve across which the residual flesh is extruded. The carcases having this residual flesh are previously crushed, as will be described below, and driven towards the entry E of this separation head.

In accordance with another characteristic of the invention, a device for driving under pressure is provided and constitutes, in the machine described below, the connection between the crushing device proper and this separation head 100. It can particularly be actuated from a vane pump of the type described below with reference to FIG. 7.

Contrarily then to that which occurs in the machines of the known art, where a helicoidal screw which drives and presses the crushed carcases against the grille, the mashing and scraping member 2 does not drive them. Its function is to mash the carcases during their transit from the entrance E of the head towards the exit S so that it creates, at this level, a certain homogenisation of the product being treated. The driving under pressure of the product is precisely, in the case of the present invention, ensured thanks to the vane pump previously mentioned.

Figure 2:
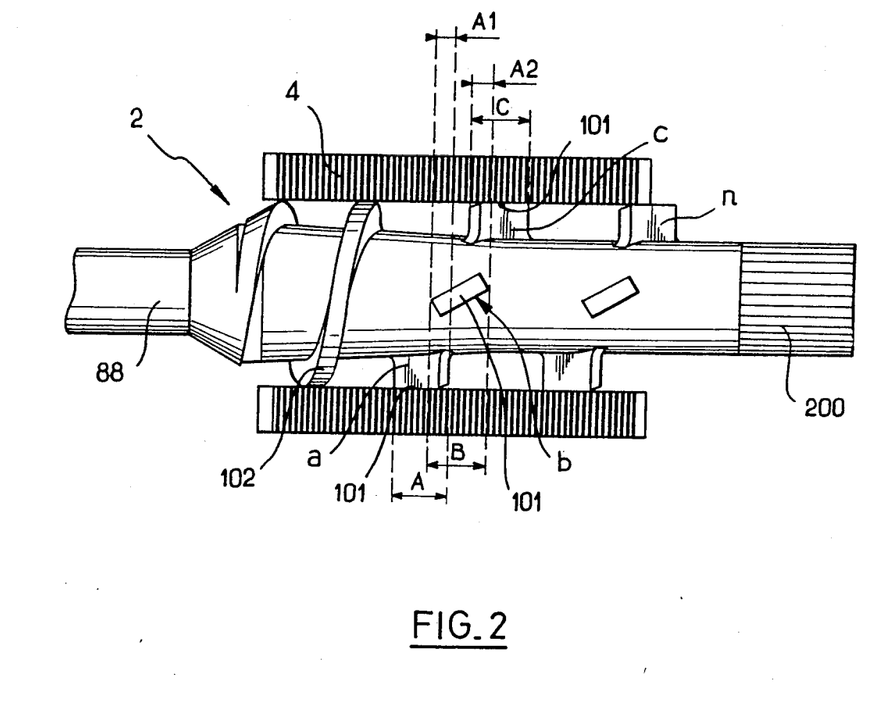
FIG. 2 shows a mashing and scraping member intended, in accordance with the invention, to equip a separation head of FIG. 1.

In accordance with another important characteristic of the invention, this mashing and scraping member 2 carries out a second function, that is to say the scraping of the internal face of the grille 4, so that the risks of wedging of pieces of bone in the meshes of the grille are limited as much as possible. This result is obtained thanks to the profile adopted of this member referred to in the rest of the description as the mashing and scraping member 2, and which is illustrated in FIG. 2. It comprises a frusto-conical member having a plurality of teeth such as a, b, c . . . n, each having a surface 101 constituting a scraping surface, and capable of drawing from the meshes of the grille 4 the hard bodies which could slide there. The distribution and geometry of these teeth is such that, on their displacement, when the mashing and scraping member 2 turns, they cover the totality of the internal surface of the grille 4. This covering being total on each turn, the risks of occlusion of the meshes are thus practically non-existent. FIG. 2 illustrates more clearly this extremely important preferred feature of the invention. The extent A corresponds to the cleaning zone ensured by the surface 101 of one of the teeth, for example the tooth a. Simililarly the extents B and C correspond respectively to the cleaning zones assured by the following teeth b and c. It can be clearly seen, in FIG. 2, that there exists overlap spaces $A_1$, $A_2$ . . between the different cleaning areas. In the illustrative embodiment, there are teeth spaced every 90° about the circumference of member 2 and the edges 101 of the teeth which scrape the internal surface of the grille. At the end (exit side) of the mashing and scraping member 2, there is a thread 102 of which the function is to facilitate emptying of the waste.

Such a member 2 of the invention, has a splined front end 200 intended to be fixed by means capable of driving it in rotation, as will be explained below. The downstream end has a tail 88 of which the end has a first thread 89 screwed into a sleeve 10, (see FIG. 1). A ball bearing 9 permits rotation of the tail 88. A seal 7, a thrust member 8 and a closing flange 11 complete the assembly.

In accordance with a preferred feature of the invention, the mashing and rotating member 2 is floatingly mounted and can be displaced inside the support of the head 1 thanks to a thread 89, so that the opening of the waste cone 5, corresponding to the exit S of the head, is adjustable. The adjustment having been obtained, a lock-nut 12 threaded on a second thread 90 of the tail 88 locks the assembly at this adjustment.

Such a mashing and scraping member 2 has the advantage of ensuring certain dispersement of the product whatever its viscosity or its bone content, in contrast to the case of helicoidal screw systems. The product does not have to go through an unsuitable step and further at the end of the operation the periphery of the material no longer risks the formation of a crust of bone which hinders the progress of the meat at the meshes of the sieve; which results in a detrimental feed and a non-acceptable heating. On the contrary in the present invention the product in the course of separation is constantly mashed and there is then a homogenity between the periphery and the centre.

The grille 4 is inserted in the support of the head 1. It is strongly compressed by means of a set of bars 3 fixed by fixing screws 6, which prevent it turning.

Figure 3:
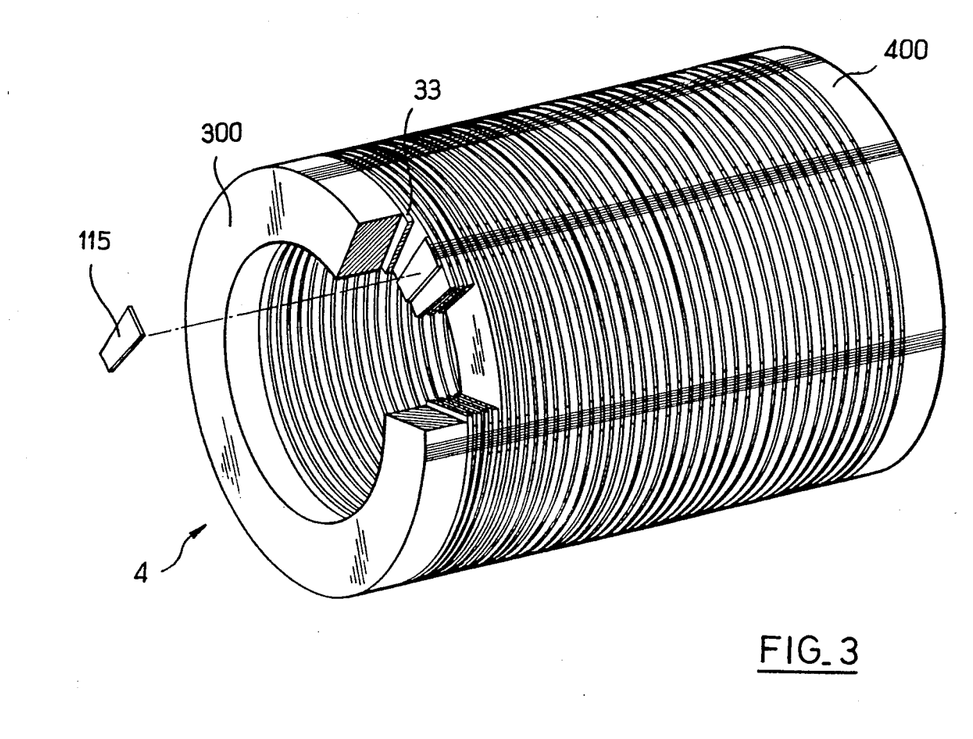
FIGS. 3, 4 and 5 illustrate examples of the structure of grilles more particularly adapted to a separation head according to the invention.

Numerous variants of grilles can be utilised. For example, as FIG. 3 shows, this can be fabricated from a jointed spiral spring 33 between which are interposed wedges 115 delimiting the meshes of the sieve which are then radial. The spring is fixed to two end flanges 300 and 400.

Figure 4:
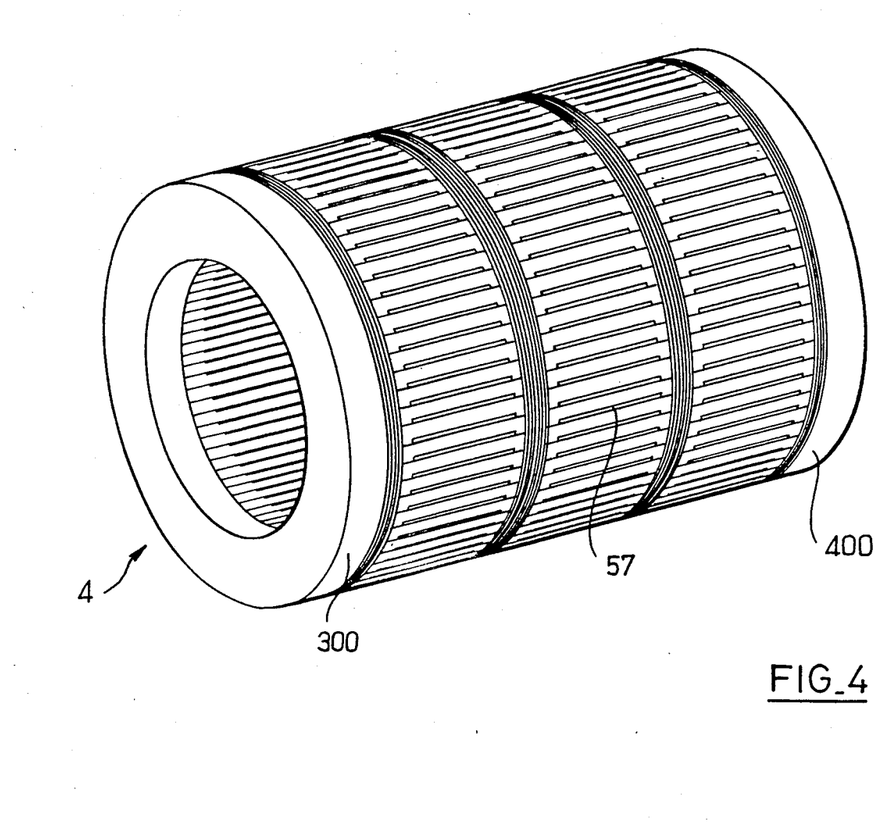
Figure 5:
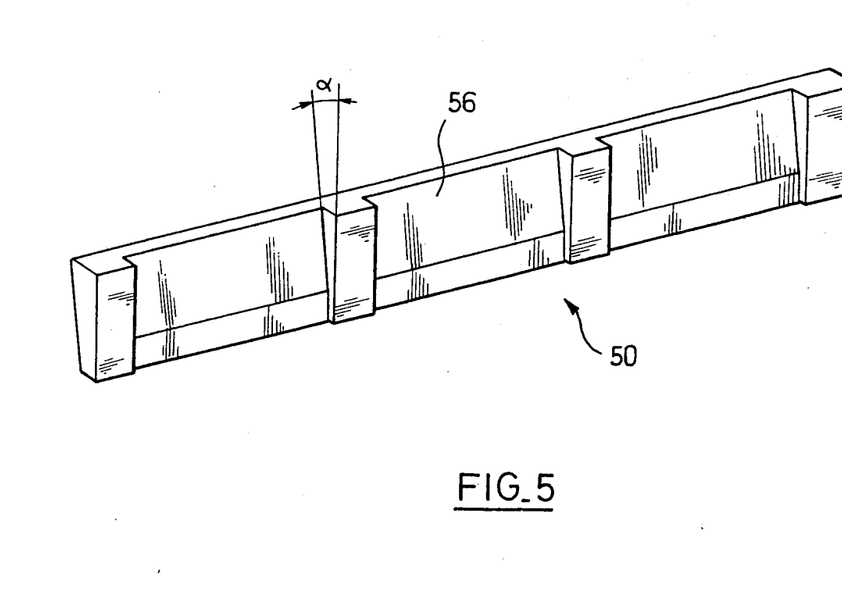

According to a variant, illustrated by FIG. 4, such a grille 4 is constituted by a series of rods 50, shown in FIG. 5, having cut-outs 56 and fixed to each other for forming a cylinder having longitudinal slots 57 constituting the meshes of the sieve across which the meat is extruded. Here again, two end flanges 300 and 400 machined to the required ribs hold the assembly. The form of the opening has, preferably, a slope of an angle $\alpha$ which is a determined by the product treated.

Figure 6:
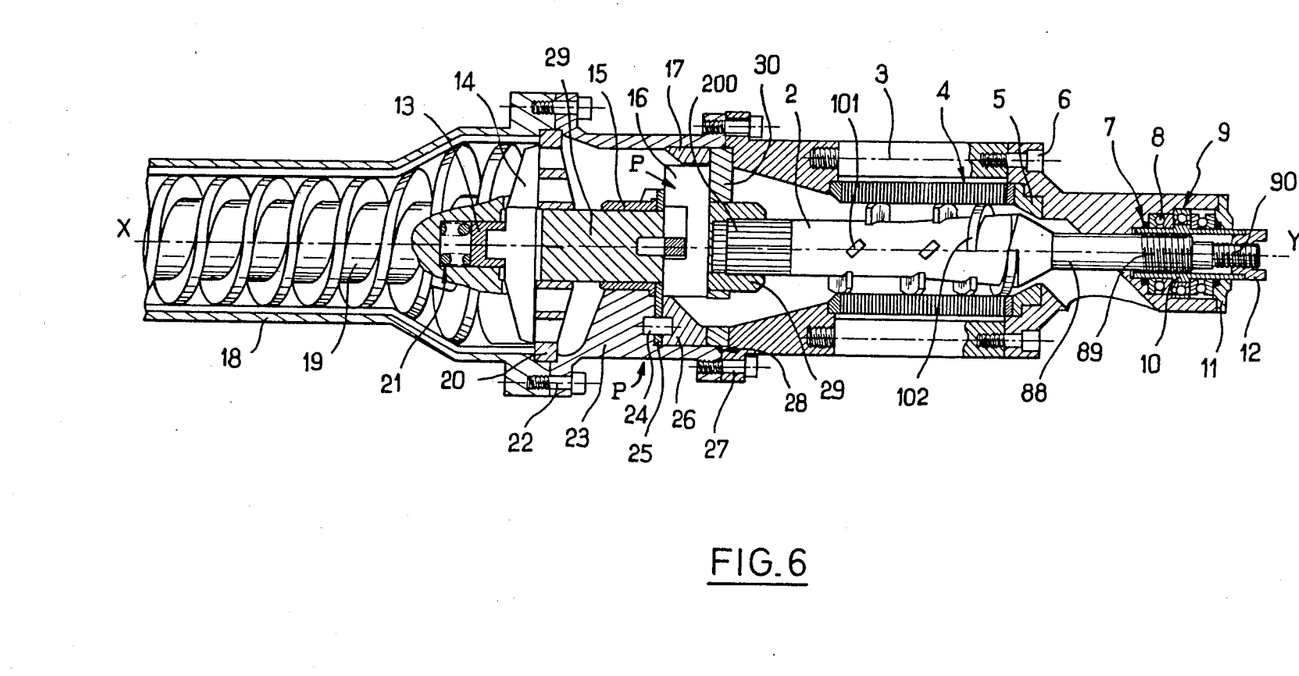
FIG. 6 shows schematically a machine equipped with a separation head according to the invention.
Figure 7:
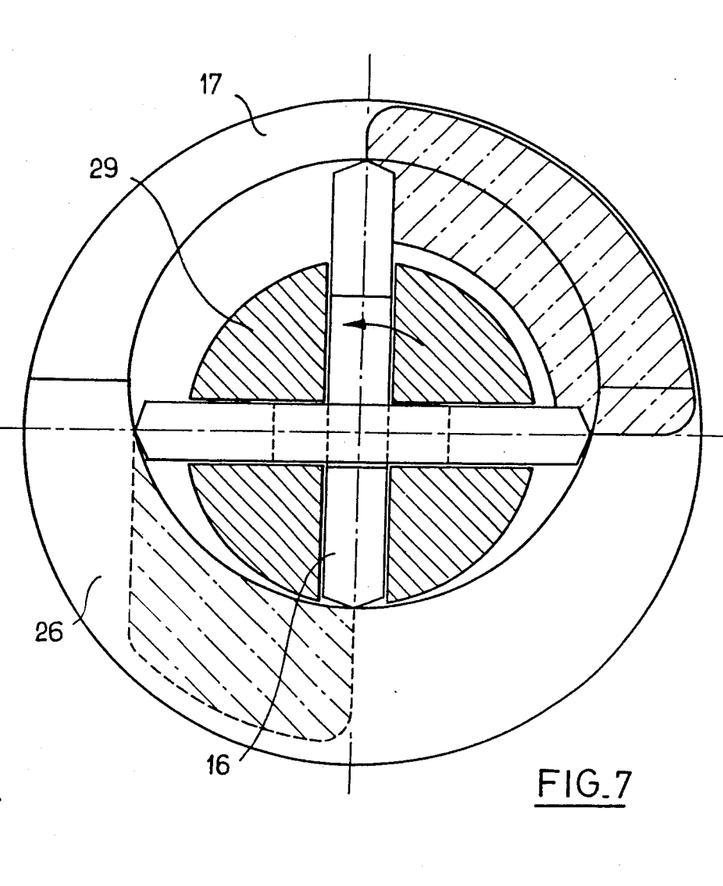
FIGS. 7 and 8 illustrate in plan and cross section respectively a vane pump intended to cooperate with the meshing member shown in FIG. 2.
Figure 8:
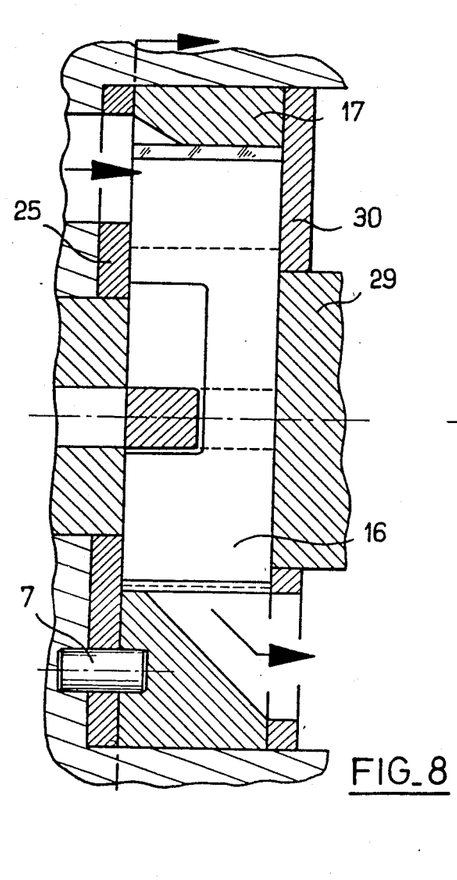

As FIG. 6 shows, the separation head 100 according to the invention, as previously described, is incorporated in a foodstuffs crushing device. A feed screw 19 drives the crushed carcases towards the latter. The product to be treated is submitted to the action of a blade 14, mounted on a spring 21, and fixed to a knife hub 13 driven in rotation by the screw 19, and which completes the crushing. The product passes across a grille 20 and is taken in by a vane 16 of pump P as illustratively shown in FIGS. 7 and 8. This acts as a device connecting the crusher 18 and the separation head 100 which ensures feed under pressure of the latter. According to an important preferred embodiment of the invention, the body of the pump is made in two half-bodies 26 and 17 as best seen in FIG. 7 non-welded and maintained fixed together by a support of the machine forming a chamber. This construction permits easy machining and easy dismounting and cleaning. Taking account of the offsetting of the compression volume, it is necessary to have an ovoid form for obtaining continuity in the thrust of the product. This result is most readily achieved by sawing of the body of the pump in two, the material lost in this operation leaving the body of the pump with the definitive ovoid shape required.

According to another important preferred feature of the invention, the rotor 29 held by a bearing 15 drives the pump P in rotation. This movement of rotation is transmitted by the blade 14 to the rotor 29 of the pump and the splined end 200 of the mashing and scraping member 2 of the separation head 100, by the intermediary of the closure plate 30. All these elements are then mounted on the same axis of rotation XY and driven by a single motor. The pump support 23, centred by means of a centering pin 24, is rendered fixed at the nose of the crusher 18 on the one hand, and of the support the head 1 on the other hand, by fixing screws 27 and 22. A joint 28 and a thrust plate 25 complete the mounting.

Such a machine is very easy to maintain, efficacious and functions without risk of high temperature prohibitive for the products treated. These applications are numerous according to the dimension given to the different elements which constitute it.

We claim:

1. A mechanical separation head for treatment of carcases crushed in a carcase crusher; the mechanical separation head comprising:

a grille fixed in said mechanical separation head for separating flesh from the carcases crushed in said crusher, said grille having meshes across which the flesh separated from the carcase is extruded;

a mashing and scraping member mounted in said separation head homogenising the crushed carcases during their transit in said separation head from an entry to an exit and scraping the internal surface of said grille for eliminating hard elements from the crushed carcases which elements tend to obstruct the meshes of said grille;

said mashing and scraping member comprising a frusto-conical piece equipped with teeth, each tooth having a tooth surface dimensioned and separated so that each said tooth surface scrapes an internal face of said grille so that when said mashing and scraping member makes a complete turn, the totality of the internal face is scraped by said teeth; and;

means for driving under pressure the crushed carcases to be treated and for serving as a connection between the carcase crusher and said head capable of forcing the crushed carcases against said grille with a pressure sufficient for the flesh to be separated from the crushed carcases and extruded across said meshes of said grille.

2. A separation head according to claim 1 including a waste ejection cone at the exit of said mechanical separation head and wherein said mashing and scraping member has means for adjusting said ejection cone by displacement of said mashing and scraping member.

3. A separation head according to claim 2 wherein said means for adjusting is constituted by a sleeve cooperating with a first thread made in a tail of said mashing and scraping member; and a lock-nut cooperating with a second thread made in said tail.

4. A separation head according to claim 1 wherein said grille is constituted by a spring of jointed spirals; and wedges cooperating with said spring of jointed spirals for forming said meshes of said grille oriented in the radial direction.

5. A separation head according to claim 1 wherein said grille is constituted by a succcession of rods having cut-outs and fixed to each other to form a cylinder having longitudinal slots constituting said meshes of said grille.

6. A separation head according to claim 5 wherein each cut-out has a slope of angle $\alpha$, which is a function of the carcase to be treated.

7. A separation head according to claim 1 wherein said means for driving under pressure the crushed carcases to be separated is a vane pump, said pump having a body constituted by two non-welded half-bodies fixed to each other so that the definitive form of said body is ovoid.

8. A machine according to claim 1 and including said carcase crusher, wherein said means for driving under pressure the carcases to be separated is a vane pump having a rotor driving a vane of said pump; said rotor drives also in rotation the mashing and scraping member; said crusher has a drive screw and a plurality of blades driven in rotation by said drive screw; and said rotor of said pump is driven in rotation by said blades.

* * * * *